United States Patent
Mesde et al.

(10) Patent No.: US 12,411,757 B1
(45) Date of Patent: Sep. 9, 2025

(54) VEHICLE SOFTWARE CHANGE CONTROL SYSTEM

(71) Applicant: Amazon Technologies, Inc., Seattle, WA (US)

(72) Inventors: Roland Mesde, Cupertino, CA (US); Alex Bessonov, San Jose, CA (US); Kyle Daniel Halbach, Berlin (DE); Nitin Giri, Bothell, WA (US); Edwin Ricardo Mendez Rodriguez, Seattle, WA (US); Matthew Jonathan Narksusook, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 383 days.

(21) Appl. No.: 17/809,878

(22) Filed: Jun. 29, 2022

(51) Int. Cl.
| | |
|---|---|
| G06F 11/3668 | (2025.01) |
| G06F 8/60 | (2018.01) |
| G06F 8/61 | (2018.01) |

(52) U.S. Cl.
CPC ............ *G06F 11/3688* (2013.01); *G06F 8/60* (2013.01); *G06F 8/62* (2013.01)

(58) Field of Classification Search
CPC ....... G06F 8/60–66; G06F 11/36–3696; G06F 11/3698
See application file for complete search history.

(56) References Cited

U.S. PATENT DOCUMENTS

| | | | |
|---|---|---|---|
| 8,239,858 B2 * | 8/2012 | Bocking | G06F 8/61 |
| | | | 717/176 |
| 8,719,782 B2 | 5/2014 | DeHaan | |
| 9,274,935 B1 * | 3/2016 | Lachwani | G06F 9/44505 |
| 9,292,822 B2 * | 3/2016 | Hankins | G06F 8/71 |
| 9,880,837 B2 | 1/2018 | Khazanchi et al. | |
| 10,079,832 B1 * | 9/2018 | Dearment | G06F 8/60 |
| 10,735,260 B2 * | 8/2020 | Maeda | H04L 12/40013 |
| 11,314,495 B2 | 4/2022 | Francis | |
| 11,669,439 B2 * | 6/2023 | Moondhra | H04L 9/0637 |
| | | | 717/124 |

(Continued)

OTHER PUBLICATIONS

U.S. Appl. No. 17/710,585, filed Mar. 31, 2022, Roland Mesde, et al.

(Continued)

*Primary Examiner* — Todd Aguilera
(74) *Attorney, Agent, or Firm* — Alexander A. Knapp; Kowert, Hood, Munyon, Rankin & Goetzel, P.C.

(57) ABSTRACT

A vehicle software release management system enables receipt of a vehicle software package and an associated test plan to generate a versioned software artifact set. The vehicle software release management system may initiate a workflow to manage testing, certification, and deployment of the software package based on the versioned software artifact set. The vehicle software release management system may facilitate testing of the vehicle software package, including generating test scripts and configuring the testing environment according to test configurations. The vehicle software release management system may facilitate certification of the vehicle software package according to the versioned software artifact set and manage the deployment/rollback to software package destinations.

20 Claims, 10 Drawing Sheets

(56) References Cited

U.S. PATENT DOCUMENTS

| | | | |
|---|---|---|---|
| 2005/0188371 A1* | 8/2005 | Bocking | G06F 8/61 717/178 |
| 2014/0180961 A1* | 6/2014 | Hankins | G06F 40/197 705/348 |
| 2018/0152341 A1* | 5/2018 | Maeda | G06F 8/71 |
| 2021/0382814 A1* | 12/2021 | Moondhra | G06F 21/57 |
| 2022/0078077 A1 | 3/2022 | Mifsud | |

OTHER PUBLICATIONS

U.S. Appl. No. 17/710,634, filed Mar. 31, 2022, Roland Mesde, et al.
U.S. Appl. No. 17/710,644, filed Mar. 31, 2022, Roland Mesde, et al.
U.S. Appl. No. 17/710,551, filed Mar. 31, 2022, Roland Mesde, et al.
U.S. Appl. No. 17/806,434, filed Jun. 10, 2022, Roland Mesde, et al.
7924-61500 SN—U.S. Appl. No. 17/810,301, filed Jun. 30, 2022, Roland Mesde, et al.
U.S. Appl. No. 17/809,868, filed Jun. 29, 2022, Roland Mesde, et al.
U.S. Appl. No. 17/727,592, filed Apr. 22, 2022, Brett Francis.

* cited by examiner

VEHICLE SOFTWARE CHANGE CONTROL SYSTEM

BACKGROUND

Various vehicle systems are equipped with software that allow components of the vehicle to function. For example, vehicle software may be used to control vehicle control systems, vehicle infotainment systems, vehicle environmental control systems, navigation systems, etc. For various reasons, it may be advantageous for vehicle manufactures to update vehicle software, such as to correct software issues, improve performance, add new features, protect against discovered vulnerabilities, prevent unwanted access to the vehicle control systems, amongst various other uses. Over the course of the vehicle's lifetime, there may be various reasons to update vehicle software for various ones the vehicle components and such updates may require proper versioning and vetting before being deployed.

Figure 1:
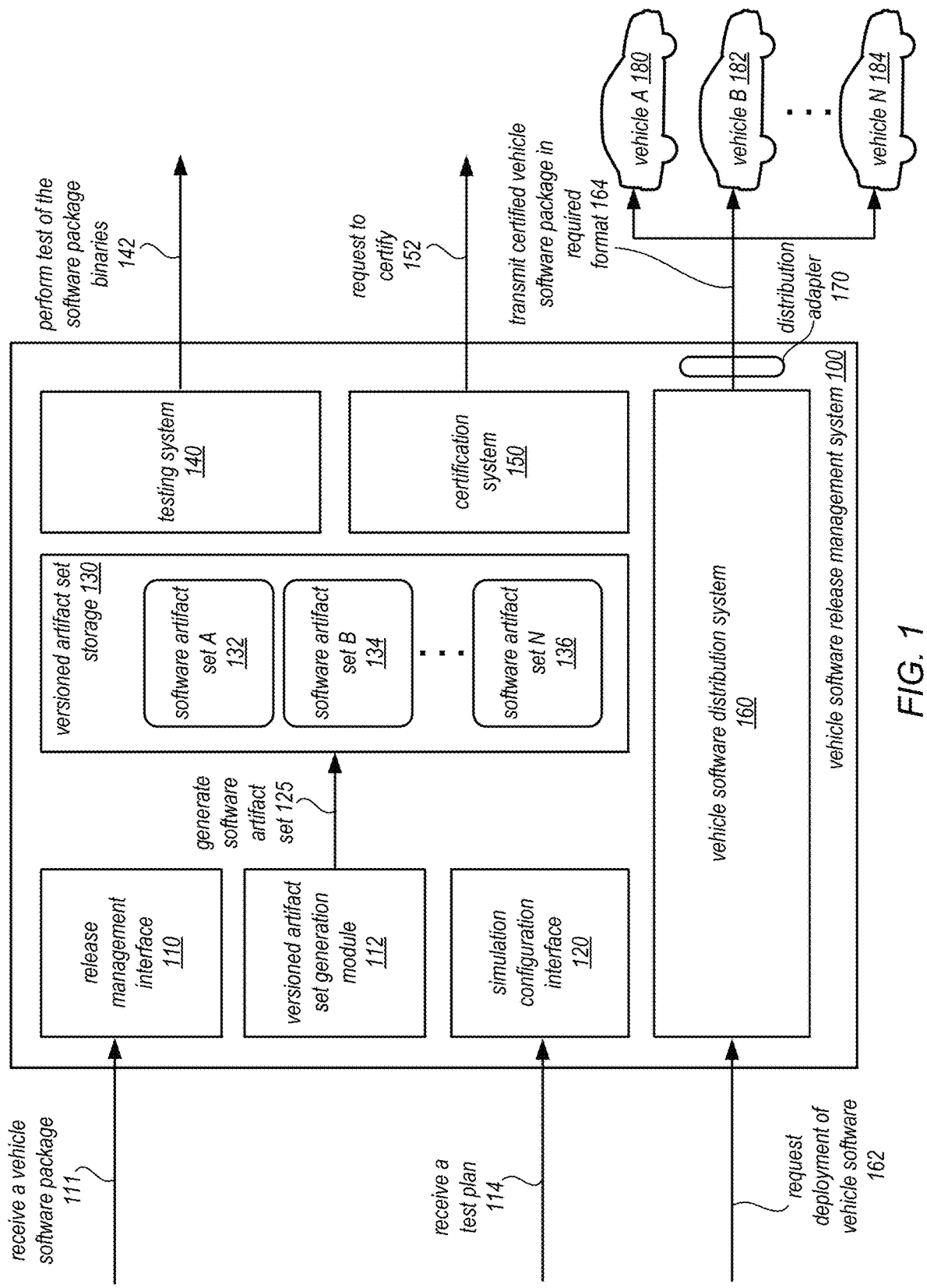
FIG. 1 illustrates a vehicle software release management system that receives a vehicle software package and a test plan that are used to generate a versioned artifact set. The vehicle software release management system allows performance of testing and certification of the software package according to the software artifact set and distributes the certified vehicle software package to one or more destinations, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a vehicle software release management system that receives a vehicle software package, an associated test plan, and generates a versioned artifact set. The vehicle software release management system may furthermore oversee testing, certification, and deployment of the software package based on the versioned artifact set.

For example, various vehicle systems may be embedded with software that enable vehicle systems and the components therein to function. Vehicle software may be required in controlling any number of vehicle functions ranging from controlling the brakes to receiving signals from a sensor. Updates to the vehicle software may be made periodically to maintain correct functioning of the software. Additionally, regular updates to the software may be necessary to fix bugs in the software, improve performance of the component, add new features, and/or protect against discovered security vulnerabilities. Management of the multiple software packages for the various components of a vehicle system poses a non-trivial challenge as the various packages need to be organized, tested, and certified before being deployed to a correct destination. Moreover, with regard to a specific software package, its testing environment, testing procedure, and certification procedure may be unique to its version of the software and/or to an associated vehicle model that the software package is to be deployed to. For example, in order for the software package to be deployed, a vehicle system owner, such as an original equipment manufacturer (OEM) may require the software package to be tested, and such testing may be required to be carried out in the correct operating system of the vehicle model having the correct test resources and dependencies that are associated to that unique version of the software package.

A vehicle software release management system may provide a mechanism for vehicle software packages to be tested, certified, and then sent to a vehicle software release management system. The vehicle software release management system may also organize a given received vehicle software package into a versioned artifact set containing various software artifacts necessary to complete the vetting process of the received vehicle software package and enable deployment of the received vehicle software package (subsequent to certification) to a software package destination. In some embodiments, the vehicle software release management system may receive a test plan that describes a testing environment and processes that the software package is to undergo to perform the testing. Based on the received vehicle software package and the received test plan, the vehicle software release management system may generate a software artifact set. The generated software artifact set may comprise software artifacts or files that are associated with the particular version of the software package required in the testing and certification process, including configuration files, resource files, and/or test scripts, along with the original software package. The vehicle software release management system may generate one or more components of the software artifact set that are assembled. Once the software artifact set has been generated, the vehicle software release management system may store the artifact set in a versioned artifact set storage. In some embodiments, the vehicle software release management system may initiate one or more workflows to test and certify the software package.

In some embodiments, the vehicle software release management system may enable testing of vehicle software for a vehicle model as received with the vehicle software package by the management system or otherwise determined or indicated. This may be done as part of the testing workflow. The vehicle software release management system may generate various required software components of the vehicle software testing, such as test scripts, electronic control unit configurations, and/or dependencies required to execute the vehicle software test. The vehicle software package testing may be performed in a testing environment that may be a part of the vehicle software release management system, according to some embodiments. In other embodiments, the testing environment may be outside of the vehicle software release management system. Once the test has been performed according to the test plan, the vehicle software release management system may store the resulting testing metadata in the software artifact set. In some embodiments, the vehicle software release management system may enable certification of vehicle software for the vehicle model received by the management system as part of the certification workflow. The vehicle software release management system may send a request to a certification destination according to a format required by the certification destination. The certification destination may initiate its own separate internal certification workflow to determine whether the software package should be certified and allowed to be deployed. The resulting certification response is received by the certification system and further added to the software artifact set.

In some embodiments, the vehicle software release management system may enable deployment and rollback of vehicle software for the vehicle model received by the management system. The vehicle software release management system may, in some embodiments, receive a request to deploy a certified vehicle software package to a software package destination. The vehicle software release management system may allow selection of the certified vehicle software package based on information provided by the software artifact set, including its testing metadata and its certification metadata. The vehicle software distribution system may format and transmit the requested certified vehicle software package for deployment to the deployment destination. In some embodiments, vehicle software release management system may furthermore receive a request to roll back a software package deployed to the software package destination. The vehicle software release management system may transmit a replacement certified vehicle software package determined by the vehicle software release management system, or, in some embodiments, transmit instructions to remove the portions attributed to the software package requested to be rolled back.

FIG. 1 illustrates a vehicle software release management system that receives a vehicle software package and a test plan to generate a versioned artifact set. The vehicle software release management system allows performance of testing and certification of the software package according to the software artifact set and distributes the certified vehicle software package to one or more destinations, according to some embodiments.

A vehicle software release management system 100 comprising a release management interface 110, a versioned artifact set generation module 112, a simulation configuration interface 120, a versioned artifact set storage 130, testing system 140, certification system 150, and a vehicle software distribution system 160 is illustrated in FIG. 1. In some embodiments, the vehicle software release management system 100 may receive a vehicle software package 111 through the release management interface 110. The vehicle software package may be a piece of software used in the operation of one or more components in a vehicle as well as components in data pipeline of vehicles. For example, the software package may be related to software used in a vehicle data lake or in a vehicle data pipeline. In some embodiments the vehicle software package may be associated with a certain vehicle model or a given component model as further discussed in FIG. 2.

In some embodiments, the vehicle software release management system 100 may receive a test plan 114 associated with the received vehicle software package via the simulation configuration interface 120. The test plan may detail one or more requirements and parameters for testing the received vehicle software package. In some embodiments, a test plan may be a detailed document that catalogs the test strategy, objectives, and/or the resources required in testing the vehicle software package as part of a vetting process. In some embodiments, the testing procedures described in various test plans may be different based on the vehicle model indicated for the software package, as further discussed in FIG. 2. In some embodiments, the simulation configuration interface 120 may configure the testing system 140 and/or a testing environment to conform to the testing environment described in the test plan. Once the vehicle software package and test plan have been received, the versioned artifact set generation module 112 generates a software artifact set 125. The software artifact set may comprise software artifacts or files that are associated with a particular version of the software package required in the testing and certification process, including configuration files, resource files, and/or test scripts. Various components of the software artifact set may be generated by the release management interface 110, versioned artifact set generation module 112, and/or the simulation configuration interface 120. For example, a test script associated with the received test plan for the software package may be generated by the simulation configuration interface.

Once the software artifact set has been generated, the vehicle software release management system may store the artifact set in a versioned artifact set storage 130. The versioned artifact set storage 130 may contain multiple software artifact sets for each of a plurality of received vehicle software packages. For example, the versioned artifact set storage 130 may contain software artifact set A 132, software artifact set B 134, and software artifact set N 136 each with an artifact set that contains a different vehicle software package. In some embodiments, the software artifact sets may differ not based on the vehicle software package, but based on other artifacts such as the test plan as further discussed in FIG. 5. For example, a same software package may reside in two different artifact sets, wherein the given software package was tested according to two different test plans. The vehicle software release management system 100 may initiate workflows to test and certify the received vehicle software package using the associated software artifact set.

In some embodiments, the testing system 140 of the vehicle software release management system 100 may obtain the software package and relevant artifacts stored in the software artifact set that are required to perform a test of the software package binaries 142. The testing environment for the test for the software package may be created inside the testing system 140 or may be generated in a resource outside of the vehicle software release management system 100. In the latter scenario, the testing system may send relevant software artifacts to test the software, including any relevant test scripts, dependencies, and/or software package binaries. Once the test has been performed according to the test plan, the vehicle testing system 140 may store the resulting testing metadata in the associated software artifact set. The certification response may be added to the relevant software artifact set.

In some embodiments, the vehicle software distribution system 160 of the vehicle software release management system 100 may receive a request for deployment of the vehicle software package 162. The vehicle software distribution system may obtain the correct software artifact set associated with the indicated deployment request, verify that it has been certified, and transmit the certified vehicle software package in the required format 164 via a distribution adapter 170. In some embodiments, the certified vehicle software package may be sent to multiple destinations, such as vehicle A 180, vehicle B 182, and vehicle N 184. Although FIG. 1 depicts only vehicles as the destination of the certified vehicle software package, the software package may be requested to be deployed to any component involved in a vehicle data pipeline. For example, in some embodiments, the vehicle software package may be sent to a vehicle edge distribution location, a vehicle data pipeline, a vehicle data late, or other components involved in the vehicle data pipeline, as further discussed in FIG. 6.

Figure 2:
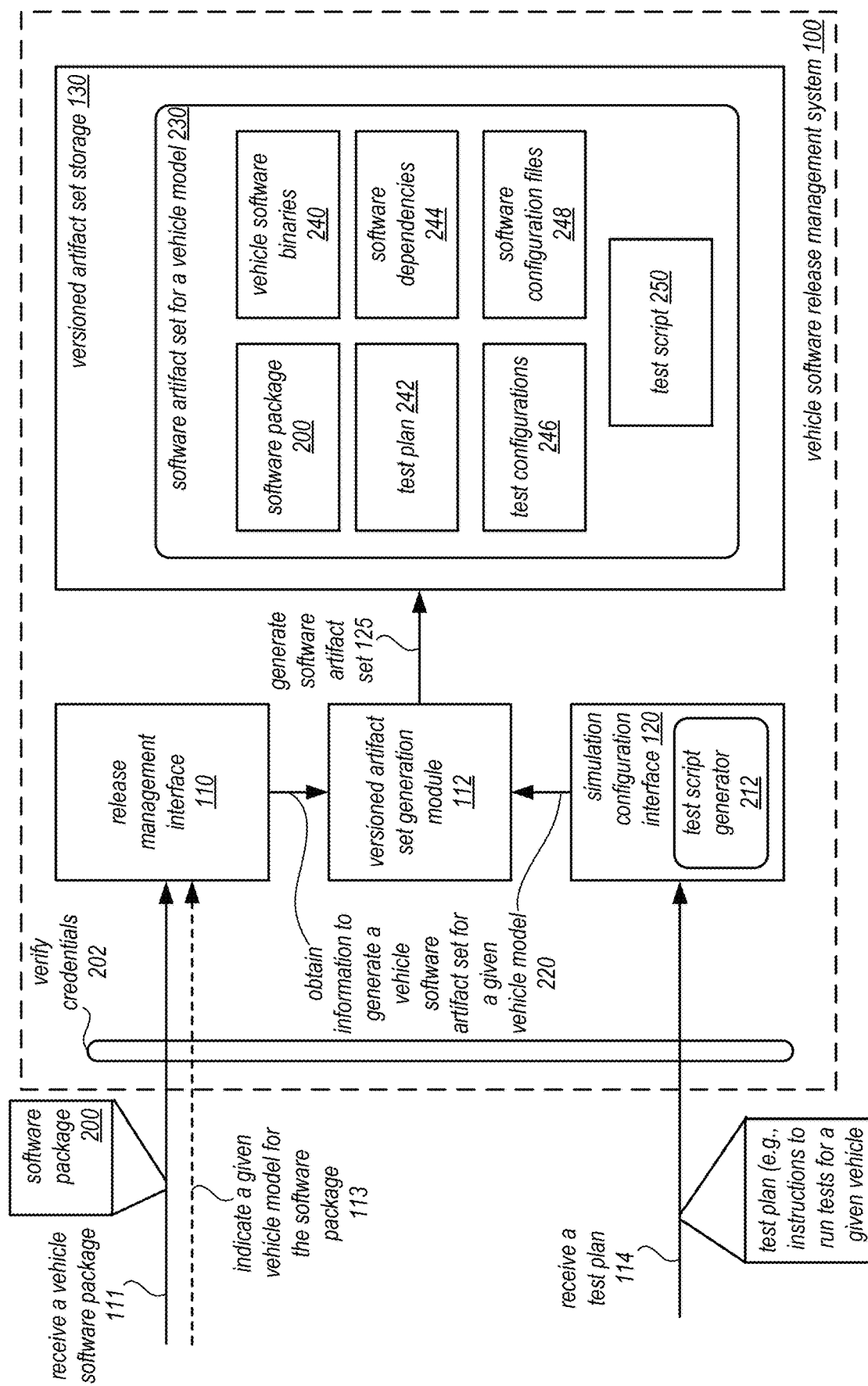
FIG. 2 illustrates a more detailed view of a vehicle software release management system that receives a vehicle software package and a test plan that are used to generate a versioned artifact set for a vehicle model that may be stored in a versioned artifact set storage, according to some embodiments.

FIG. 2 illustrates a more detailed view of a vehicle software release management system that receives a vehicle software package and a test plan to generate a versioned artifact set for a vehicle model that may be stored in a versioned artifact set storage, according to some embodiments.

In FIG. 2, the release management interface 110 may receive the vehicle software package 111 as described in FIG. 1. In some embodiments, the received vehicle software package may be a software package 200 for a given vehicle model. The software package 200 may be for one or more components having a given vehicle specification, such as a specific vehicle make and/or model. In some embodiments, the software package 200 may be for multiple vehicle models and may be deployable to multiple vehicle models. In some embodiments, the vehicle software package 200 may not be for a vehicle but for a component of a vehicle data pipeline or vehicle data stream generation process. For example, the software package may be related to software used in a vehicle data lake. The software package 200 may be software used in the operation of a range of components in vehicles as well as a range of components in data pipeline of vehicles.

In some embodiments, the vehicle software release management system 100 may be configured to verify credentials 202 and determine whether the vehicle software package 200, or any other information sent to the vehicle software release management system 100, has proper authorization. In some embodiments, the vehicle software release management system 100 may process credentials sent with the software package 200. For example, the software release management system 100 may verify HTTP authentication credentials such as username and password sent alongside an API call used to send the software package 200. In some embodiments, various other authentication techniques, such as key authentication using unique keys disclosed to authorized users or OAuth frameworks may be used to verify credentials 202 of various requests. In some embodiments, the request to receive the software package 200 may result in a lookup on a username, username password, role, or other identity of the software package 200 sender. Unauthorized software packages, requests to receive software packages, or request to deploy/roll back software packages may be denied upon determination that the request has improper access credentials. The term "access credentials" or "credentials" are used herein to mean various credentials that verify the identity of the requesting entity and/or authorization granted to the requesting entity that is required to perform the requested action. For example, in some embodiments, the software management system 100 may reject a request made by a user having a verified identity (e.g., known username and password) because the entity associated with the verified identity has lacks authorization to access data targeted by the request, e.g., the entity has improper "access credentials" based on a lack of authorization to perform the request.

The vehicle software release management system 100 may send a notification of the denial of permissions to vehicle software release management system 100 managers. The vehicle software release management system 100 may verify the credentials of the request to indicate a given vehicle model of the software package 113 and the request to receive a test plan 114 in a manner similar to the techniques described above. In some embodiments, the given vehicle model for the software package may be indicated in the software package 200 itself or in the request sent to the vehicle software release managements system 100 to receive the software package 200.

In some embodiments, the simulation configuration interface 120 may receive a test plan 210 to run tests for a given software package for a given vehicle model. The test plan 210 may be associated with the software package 200 and may describe the test strategy, objectives, and resources required in testing the vehicle software package 200. Various testing information may be provided to the simulation configuration interface 120 through the test plan 210. Testing information provided through the test plan 210 may include configuration files of the testing environment, configuration files of the software package 200, resource files for the testing environment, resource files for the software package 200, and/or a test script 250. In some embodiments, the simulation configuration interface 120 may use a test script generator 212 to generate a test script 250 according to the test plan. In some embodiments, the test configuration files, and the test resources may be generated by the simulation configuration interface 120 according to the received test plan 210. The test script 250 may be one or more pieces of software that are to be run during the testing of the software package 200.

Various components of the software artifact set may be generated by the release management interface 110, versioned artifact set generation module 112, and/or the simulation configuration interface 120. For example, test script generator 212 may generate a test script according to the received test plan 210. The versioned artifact set generation module 112 may obtain the various software artifacts, including the software package 200 and the test plan 210 to generate a software artifact set 125. In some embodiments, a software artifact set for a vehicle model 230 may be generated by the versioned artifact set generation module 112 and stored in the versioned artifact set storage 130. The software artifact set for the vehicle model 230 may include the received software package 200, test plan 242, test configurations 246, test scripts 250, vehicle software binaries 240, software dependencies 244, and software configuration files 248. The test configurations 246 may define parameters, options, settings and/or other preferences of tests to be run on the software package, and may furthermore describe the testing environment that the software packages are to be tested on. In some embodiments, the test configurations 246 may be generated by the versioned artifact set generation module 112 in accordance with the test plan 242. In some embodiments, the vehicle software binaries 240 may be generated by the versioned artifact set generation module 112. The software binaries 240 may be complied code that allows the software package 200 to be installed without having to compile the source code in the destination. The software binaries 240 may be in a format that allows a vehicle destination to apply the code without a separate compilation step. In some embodiments, the software dependencies 244 may be various code libraries or packages, that the vehicle software package 200 depends upon and that are reused in the execution of the vehicle software package 200. The software dependencies 244 may be direct dependencies that the software package 200 calls directly in its code, or they may be transitive dependencies that a dependency of the software package 200 is dependent upon. The versioned artifact set generation module may be provided one or more portions of the software dependencies 244 with the software package 200 in the initial request to receive the software package, or the versioned artifact set generation module 112 may determine the software dependencies 244 based on analysis of the received software package 200.

Figure 3:
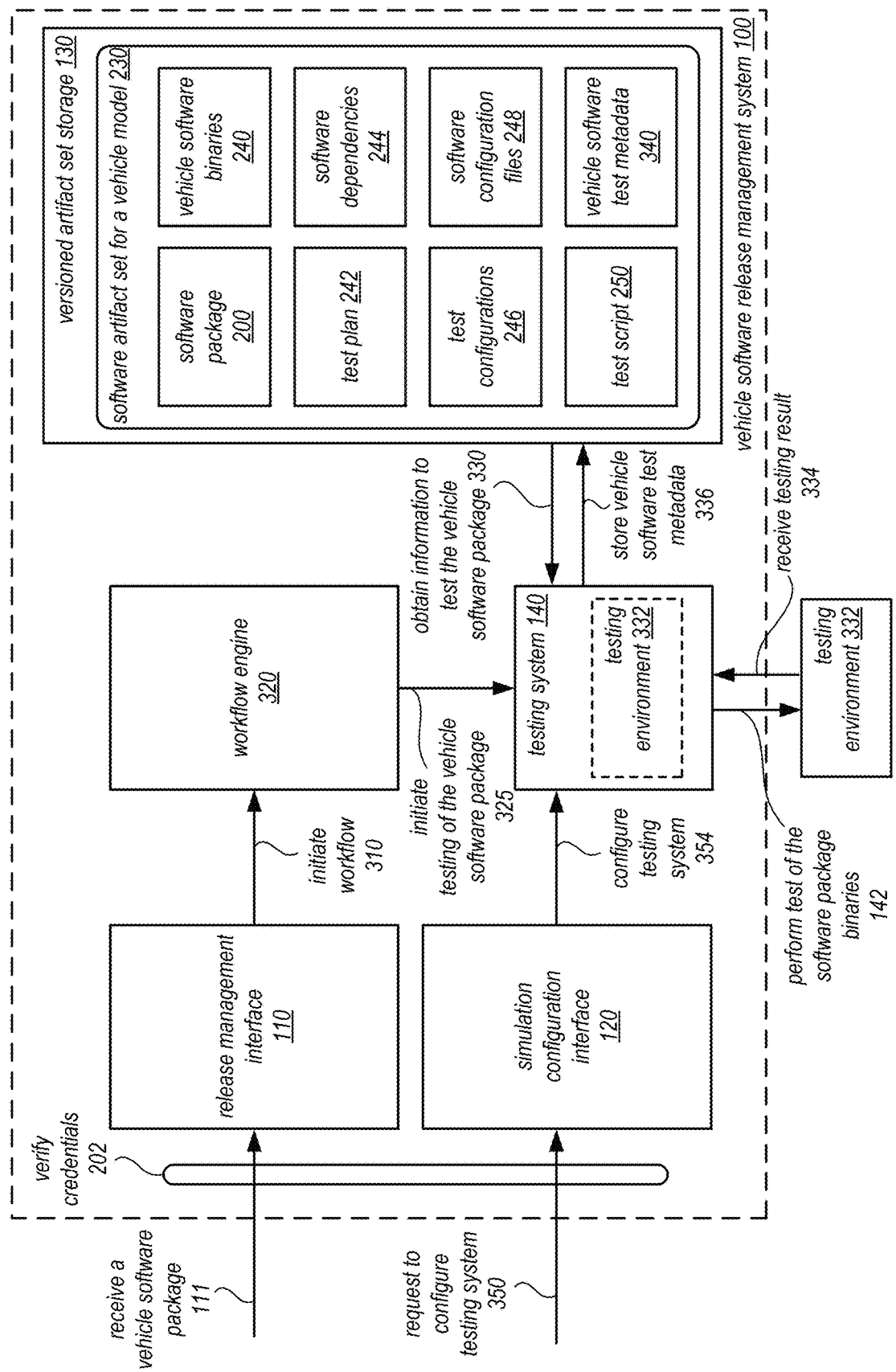
FIG. 3 illustrates a more detailed view of a vehicle software release management system that initiates a workflow to perform testing of a vehicle software package according to the associated software artifact set for a vehicle model and incorporates the vehicle software test metadata (e.g., testing parameters and testing results) into the software artifact set for the vehicle model, according to some embodiments.

FIG. 3 illustrates a more detailed view of a vehicle software release management system that initiates a workflow to perform testing of a vehicle software package according to the associated software artifact set for a vehicle model and storing the vehicle software test metadata in the software artifact set for the vehicle model, according to some embodiments.

In some embodiments, the receipt of a vehicle software package 111 as described in FIG. 1 may trigger the release management interface 110 to initiate a workflow 310 which may include performing one or more operations to test the received vehicle software package 200. A workflow engine 320 may initiate the testing of the vehicle software package 325 using the testing system 140. The testing system 140 of the vehicle software release management system 100 may obtain 220 information required to test the vehicle software package 330 in the software artifact set for a vehicle model 230—the required testing information may include the software package 200, the vehicle software binaries 240, the test plan 242, the test configurations 246, and/or the test script 250.

In some embodiments, testing environment 332 may be implemented by the provider network of the vehicle software release management system 100. Testing environment 332 may offer instances, containers, and/or functions according to various configurations for testing including the performance of the test script 250. In some embodiments, testing environment 332 may, for example, comprise one or more servers with a specified computational capacity (which may be specified by indicating the type and number of CPUs, the main memory size, and so on, for example to replicate conditions of an electronic control unit (ECU) of a vehicle) and a specified software stack (e.g., a particular version of an operating system, as may be used in a vehicle environment, such as on an ECU). A testing environment 332 may provide a virtual operation system or other operating environment for executing or implementing the vehicle software package 200. The vehicle software package 200 may be implemented as one or more operations that are performed upon request or in response to an event, and the testing environment 332 may be automatically scaled to provide the appropriate number and/or type of computing resources to perform the operations in accordance with the testing requirements described in the test plan 242. A number of different types of computing devices may be used singly or in combination to implement the testing environment 332, including general purpose or special purpose computer servers, storage devices, network devices and the like. In some embodiments, the testing environment 332 may be implemented as part of the testing system 140 of the vehicle software release management system 100. In some embodiments, the computing devices used to implement the testing environment 332 may be cloud resources that are configured to simulate vehicle resources, such as ECUs, etc.

Various compute instances, containers, and/or functions may be used to operate or implement a variety of different testing environments, such as operating systems of various vehicle models or components. The testing environment 332 may support various interpreted or compiled programming languages such as Ruby, Perl, Python, C, C++ and the like, or high-performance computing services suitable for performing the software package testing. In some embodiments, testing environment 332 may be configured according to test configurations 246. For example, the size of compute instances, containers, and/or functions, such as a particular number of virtual CPU cores, memory, cache, storage, as well as any other performance characteristic may be determined by the test configurations 246 (for example in order to simulate vehicle systems). In some embodiments, the test configurations 246 may determine properties of the electronic control units simulated in the testing environment 332 of the vehicle model that the software package 200 is intended to be deployed to. For example, the test configuration 246 may determine the operating system of the electronic control unit being simulated in the testing environment 332. Configurations of the compute instances, containers, and/or functions of the testing environment 332 may furthermore be determined by a request to configure the testing system 350. In some embodiments, the simulation configuration interface 120 may receive a request to configure the testing system 350, and upon verification of correct credentials 202, may configure the testing system 354 according to the received request. In various embodiments, the software package 200 and/or vehicle software binaries 240 may be implemented by a particular node or may be distributed across several nodes. In some embodiments, a given node may implement the functionality of more than one service system component (e.g., more than one data store component).

Once the testing system 140 has performed the test of the software package/software package binaries 142, the testing system 140 may receive a testing result 334 documenting the results of the test according to the test plan. The test results may comprise one or more statistics measuring the performance of the vehicle software package 200 and/or determinations whether the software package 200 meets the requirements of the software testing described in the test plan 242. In some embodiments, the results of the test script 250 used to test the software package 200 may also be returned to the testing system 140. Once the test result has been received by the testing system 140, in some embodiments, the testing system 140 may store 336 vehicle software test metadata containing the received test results in the software artifact set for the vehicle model 230. The software artifact set 230 may store the test results in the vehicle software test metadata 340. In some embodiments, multiple iterations of the test having different test plans may be performed upon a request to configure testing system 350 and the results of the respective runs may be stored in the software artifact set 230 as part of the vehicle software test metadata 340. In some embodiments, a particular iteration of the tests may generate a different software artifact set for the vehicle model associated with a particular software test iteration.

Figure 4:
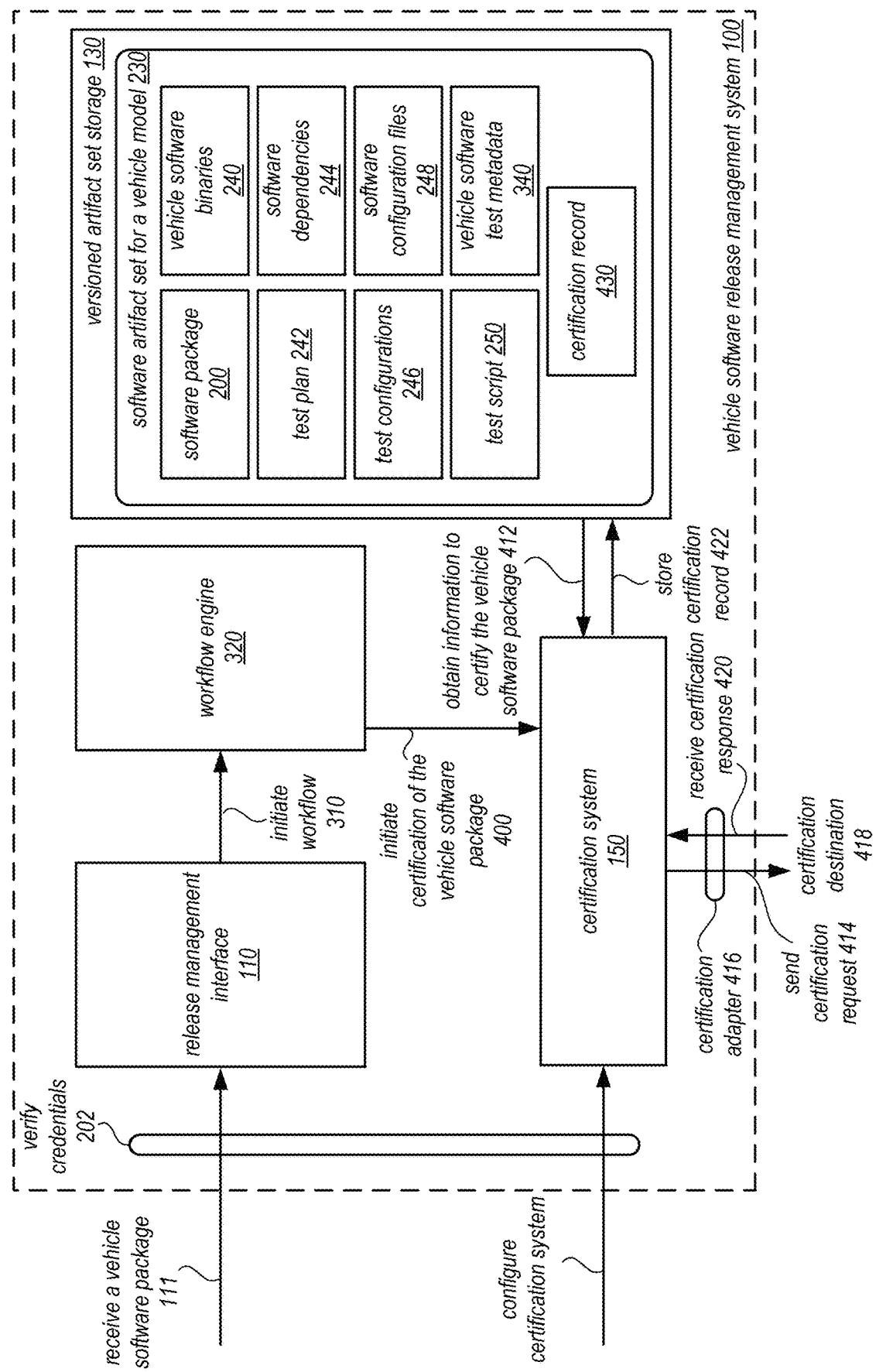
FIG. 4 illustrates a more detailed view of a vehicle software release management system that initiates a workflow to perform certification of a vehicle software package corresponding to an associated software artifact set for a vehicle model. The release management system also incorporates the vehicle software certification metadata into a software artifact set that is stored by the vehicle software release management system for the vehicle model, according to some embodiments.

FIG. 4 illustrates a more detailed view of a vehicle software release management system that initiates a workflow to perform certification of a vehicle software package according to a corresponding software artifact set for a particular vehicle model. The vehicle software release management system also stores the vehicle software certification metadata in the software artifact set for the vehicle model, according to some embodiments.

In some embodiments, as part of the workflow initiated by the release management interface 110 as discussed in FIG. 1, the workflow engine 320 may initiate certification of the vehicle software package 400. In some embodiments, the certification system 150 may obtain information to certify the software package 412 from the software artifact set associated with the software package 200. The information required to certify the vehicle software package may include results of the vehicle software testing obtained from the vehicle software test metadata 340, such as pass/fail results of test script 250 and/or performance statistics of key metrics obtained from the test plan. In some embodiments, the certification system 150 may send the certification request 414 using a certification adapter 416 to translate the request into a format acceptable to a certification destination 418. In some embodiments, the certification adapter 416 may provide programmatic interfaces (e.g., APIs, web pages or web sites, graphical user interfaces, or command-line tools) to format and send the certification request 414.

In some embodiments, the certification destination 418 may send a certification response to the certification system 150. The certification system 150 may receive certification response 420 from the certification destination 418 that indicates whether the software package is approved to be deployed to the given vehicle model. The certification system 150 may receive a rejection of certification as its certification response along with, in some embodiments, information regarding the reason for the rejection of certification. The certification system 150 may store a certification record 422 with the certification response in the software artifact set 230 upon receipt of the certification response. In some embodiments, the certification destination 418 may be used to initiate a certification workflow separate from the workflow in the vehicle software release management system 100 in order to generate the certification response. In some embodiments, the certification record 430 stored in the software artifacts set 230 may be used to determine which one of the software packages stored in the versioned artifact set storage 130 may be deployed to a software package destination.

Figure 5:
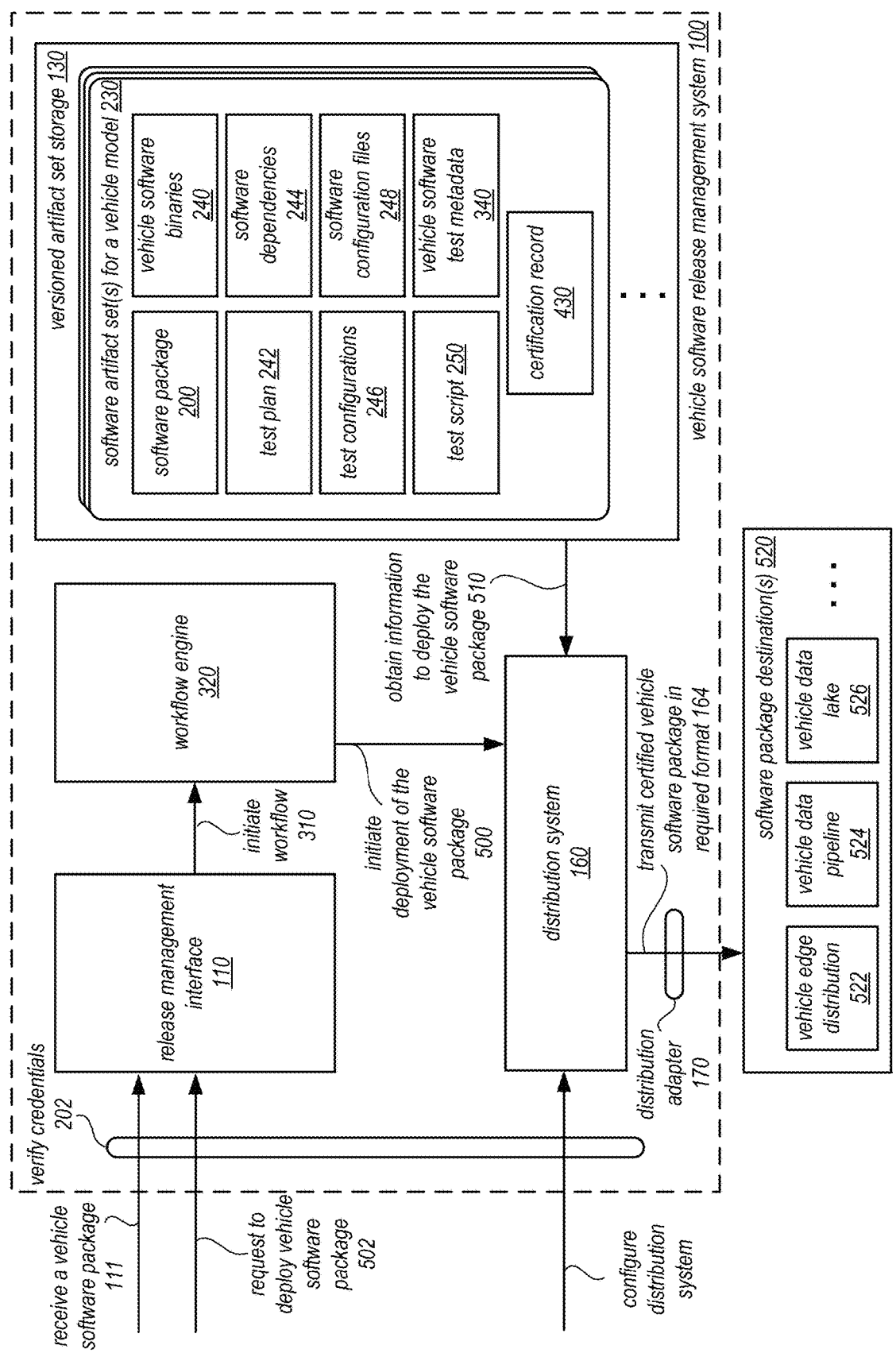
FIG. 5 illustrates a more detailed view of a vehicle software release management system that initiates a workflow to deploy a vehicle software package selected from a versioned artifact set storage to a software package destination, according to some embodiments.

FIG. 5 illustrates a more detailed view of a vehicle software release management system that initiates a workflow to deploy a vehicle software package selected from a versioned artifact set storage to a software package destination, according to some embodiments.

In some embodiments, the release management interface 110 may receive a request to deploy a selected one of vehicle software package 502. The request may indicate a software package to deploy from the one or more software artifact set(s) 230 stored in the versioned artifact set storage 130. The release management interface 110 may, in some embodiments, deploy the software package as part of the workflow initiated by the release management interface 110 upon receiving a vehicle software package, as discussed in FIG. 1. The workflow engine 320 may initiate deployment of the vehicle software package 500 and instruct the distribution system 160 to obtain information to deploy the software package 510 from the software artifact set associated with the software package 200 selected in a request to deploy. In some embodiments, the information required to deploy the software package may include the software package 200 itself and/or the vehicle software binaries 240. In some embodiments, the distribution system 150 may transmit a certified vehicle software package in the required format 164 to one or more software package destination(s) 520 using a distribution adapter 416 that translates the request into a format acceptable to the software package destination(s) 418. In some embodiments, the distribution adapter 416 may provide programmatic interfaces (e.g., APIs, web pages or web sites, graphical user interfaces, or command-line tools) to format and transmit the certified vehicle software package.

In some embodiments, the software package destination 520 may be a vehicle, vehicle component, or components involved in the vehicle data pipeline. The certified vehicle software package destination selected for the vehicle software package to be transmitted to may include one or more vehicles, a vehicle edge distribution 522, a vehicle data pipeline 524, a vehicle data lake 526, etc. In some embodiments, the vehicle edge distribution 522 may further format the transmitted vehicle software package and handle the distribution to various vehicles instead of the distribution system 150 or the distribution adapter 170. The selected vehicle software package 200 and/or the vehicle software binaries 240 may be sent to multiple software package destinations 520. For example, the software package 200 may be sent to multiple vehicles, multiple vehicle data pipelines, multiple data lakes etc.

Figure 6:
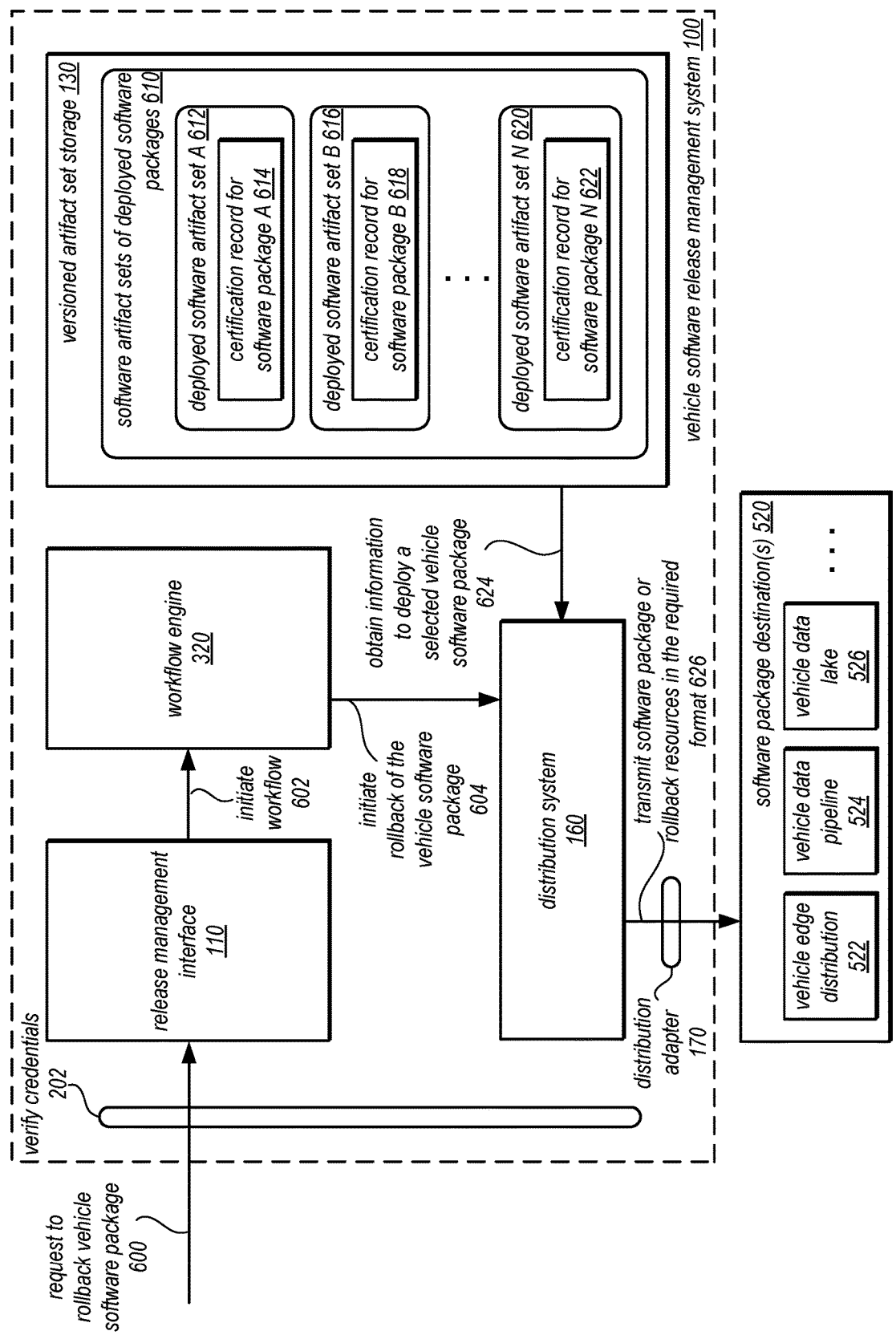
FIG. 6 illustrates a more detailed view of a vehicle software release management system that receives a request to rollback a vehicle software package and initiates a workflow to transmit a software package included in a software artifact set that was previously deployed or roll back software resources from a software package destination for a previously deployed software package, according to some embodiments.

FIG. 6 illustrates a more detailed view of a vehicle software release management system that receives a request to rollback a vehicle software package and initiates a workflow to transmit a vehicle software package from a software artifact set that was previously deployed or roll back software resources from a software package destination (such as one or more previously deploy vehicle software packages), according to some embodiments.

In some embodiments, the release management interface 110 may receive a request to roll back a deployed vehicle software package 600. The request to rollback the vehicle software package 600 may trigger a workflow 602 and cause the workflow engine 320 to initiate rollback of the vehicle software 604 that has been deployed to one or more software package destinations 520 as described in FIG. 5. The vehicle software release management system, may in some embodiments, transmit instructions to remove the portions attributed to the software package requested to be rolled back instead of providing a replacement software package. In some embodiments, the rollback request may include a selection from one of the deployed software artifact sets from which a replacement software package may be transmitted to one or more software package destination(s) 520. For example, the versioned artifact set storage 130 may store software artifact sets of deployed software packages 610 that contain multiple previously deployed software artifact sets. The software artifact sets of deployed software packages 610 may include a deployed software artifact set A 612, a deployed software artifact set B 616, and a deployed software artifact set N 620, each having a different version of the software package.

In some embodiments, the rollback request may be a request to roll back resources/portions of the deployed software package to revert back to a previous software package version. In embodiments that require transmitting a replacement software package, the distribution system may obtain information to deploy a selected vehicle software package 624, such as obtaining the software package or vehicle software binaries of the selected software artifact set. In some embodiments, the distribution system 160 may determine which one of the deployed software artifact sets is to be selected for roll back based on the respective certification records. For example, software package A 614, certification record for software package B 618, or certification record for software package N 622 of the respective deployed software artifact sets may be analyzed to determine which one of the software packages is to be transmitted. As discussed in FIG. 5, in some embodiments, the software package destination(s) 520 may be any vehicle, vehicle component, or components involved in the vehicle data pipeline. The replacement vehicle software package may be transmitted 626 or the deployed vehicle software package may be rolled back from a vehicle, vehicle edge distribution 522, vehicle data pipeline 524, and/or vehicle data lake 526. In some embodiments, the distribution adapter 170 may further format the replacement vehicle software package to roll back to or handle the roll back of various vehicles instead of the distribution system 150.

Figure 7:
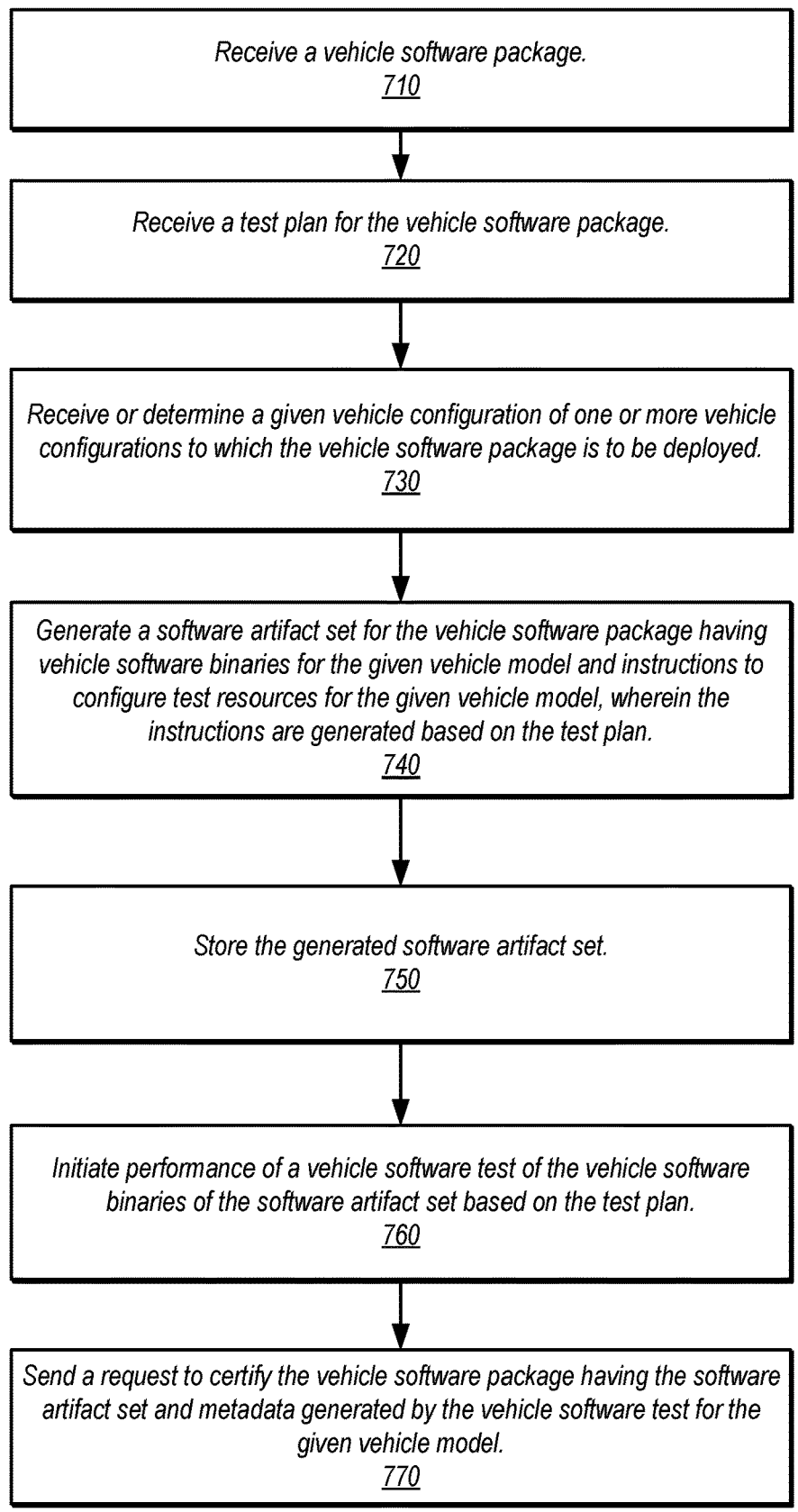
FIG. 7 illustrates a flowchart of operations performed by a vehicle software release management system to receive a vehicle software package and a test plan, generate a versioned artifact set for the vehicle software package, initiate performance of testing, and send a request to certify the software package according to certification instructions included in the software artifact set, according to some embodiments.

FIG. 7 illustrates a flowchart of operations performed by a vehicle software release management system to receive a vehicle software package and a test plan, generate a versioned artifact set for the vehicle software package, initiate performance of testing, and send request to certify the software package according to the software artifact set, according to some embodiments.

At block 710 a vehicle software release management system of a vehicle software release management system receives a vehicle software package. As discussed in FIG. 2, the software package may be for one or more components of a specific vehicle specification such as a certain make and/or model. In some embodiments, the vehicle software package may not be for a vehicle but for a component of a vehicle data pipeline having a certain model (e.g., the software package may be related to software used in a vehicle data lake).

At block 720, the vehicle software release management system receives a test plan for the vehicle software package. The test plan may be associated with the software package received at block 710 and may describe the test strategy, objectives, and the resources required in testing the vehicle software package. As discussed in FIG. 2, various other testing information may be generated using the test plan, including configuration files of the testing environment and/or the software package, resource files for the testing environment and/or the software package, and test scripts, in some embodiments.

At block 730, the vehicle software release management system receives, or determines, a given vehicle model of one or more vehicle models to which the vehicle software package is to be deployed. In some embodiments, the given vehicle model for the software package may be indicated in the software package itself or in the request by which the software package is received. In some embodiments, the vehicle software release management system may receive the vehicle model the software package is associated with, such as from a customer, an entity submitting the software package, a database of vehicle models, etc.

At block 740, the vehicle software release management system generates a software artifact set for the vehicle software package having vehicle software binaries for the given vehicle model and instructions to configure test resources for the given vehicle model, wherein the instructions are generated based on the test plan. In some embodiments, the vehicle software binaries may be generated by a versioned artifact set generation module of the vehicle release software management service. In some embodiments, the versioned artifact set generation module may further obtain software dependencies that the package depends upon or generate other software artifacts to include in the set, as discussed in FIG. 2.

At block 750, the vehicle software release management system stores the generated software artifact set. In some embodiments, the software artifact set may be stored in a versioned artifact set storage. As discussed in FIG. 1, the versioned artifact set storage may contain multiple software artifact sets for each one of the received vehicle software packages.

At block 760, the vehicle software release management system initiates performance of a vehicle software test of the vehicle software binaries of the software artifact set based on the test plan. In some embodiments, a testing system of the vehicle software release management system may obtain information to test the vehicle software package from the software artifact set for a vehicle model, as discussed in FIG. 3. In some embodiments, the testing system may obtain the software package and/or the vehicle software binaries to test in a testing environment as described by the test plan or test configurations of the software artifact set.

At block 770, the vehicle software release management system sends a request to certify the vehicle software package having the software artifact set and metadata generated by the vehicle software test for the given vehicle model. The information required to certify the vehicle software package may include results of the vehicle software testing obtained from the vehicle software test metadata such as pass/fail results of test script, performance statistics of key metrics obtained from the test plan, etc. as further described in FIG. 4.

Figure 8:
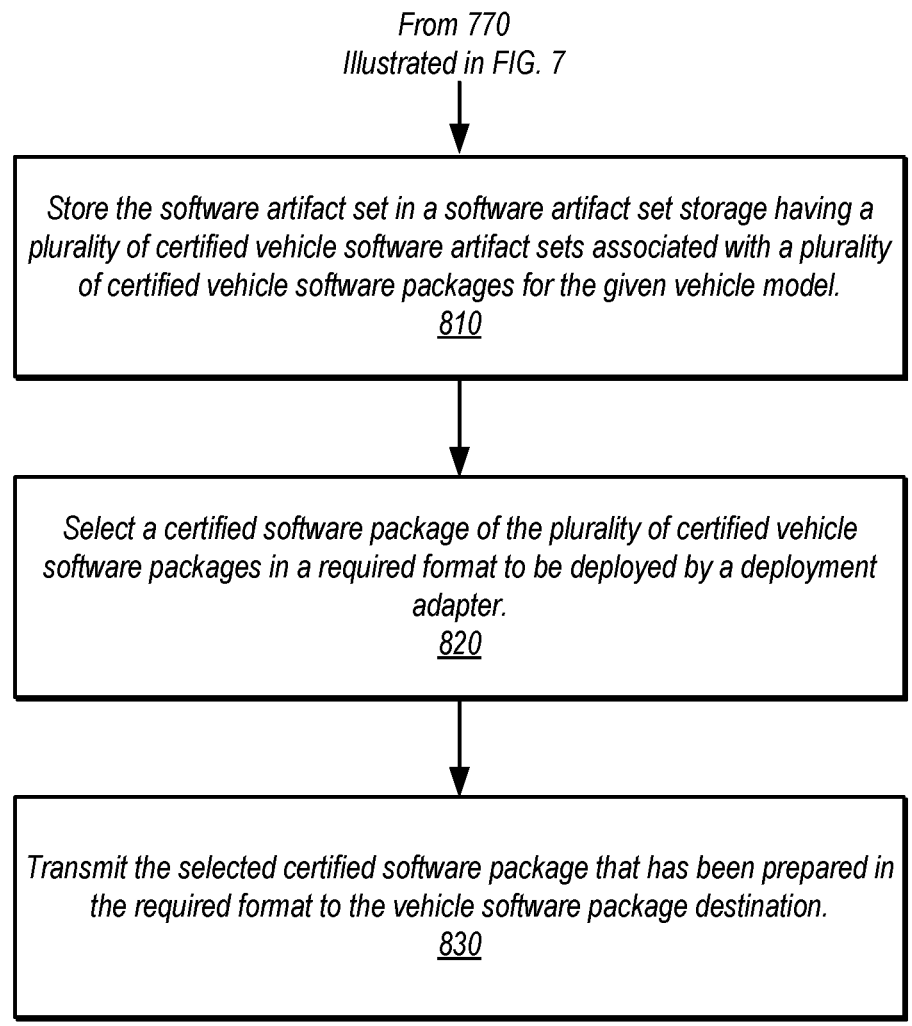
FIG. 8 illustrates a flowchart of operations performed by a vehicle software release management system to initiate deployment of a certified vehicle software package to a vehicle software package destination, according to some embodiments.

FIG. 8 illustrates a flowchart of operations performed by a vehicle software release management system to initiate deployment of a certified vehicle software package to a vehicle software package destination, according to some embodiments.

At block 810 a vehicle software release management system stores the software artifact set in a software artifact set storage having a plurality of certified vehicle software artifact sets associated with a plurality of certified vehicle software packages for the given vehicle model.

At block 820 a vehicle software release management system selects a certified software package of the plurality of certified vehicle software packages in a required format to be deployed by a distribution adapter. In some embodiments, a distribution adapter of the vehicle software release management system may translate the request into a format acceptable to the software package destination. In some embodiments, the distribution adapter may provide programmatic interfaces (e.g., APIs, web pages or web sites, graphical user interfaces, or command-line tools) to format and transmit the certified vehicle software package as described in FIG. 5.

At block 830, the vehicle software release management system transmits the selected certified software package that has been prepared in the required format to the vehicle software package destination. In some embodiments, the software package destination may be any one of a vehicle, a vehicle component, or components involved in the vehicle data pipeline. For example, as discussed in FIG. 5, the certified vehicle software package selected that is transmitted may be one or more vehicles, a vehicle edge distribution, a vehicle data pipeline, or a vehicle data lake. In some embodiments, the selected certified software package may be sent to multiple locations including multiple vehicles, multiple vehicle data pipelines, multiple data lakes etc.

Figure 9:
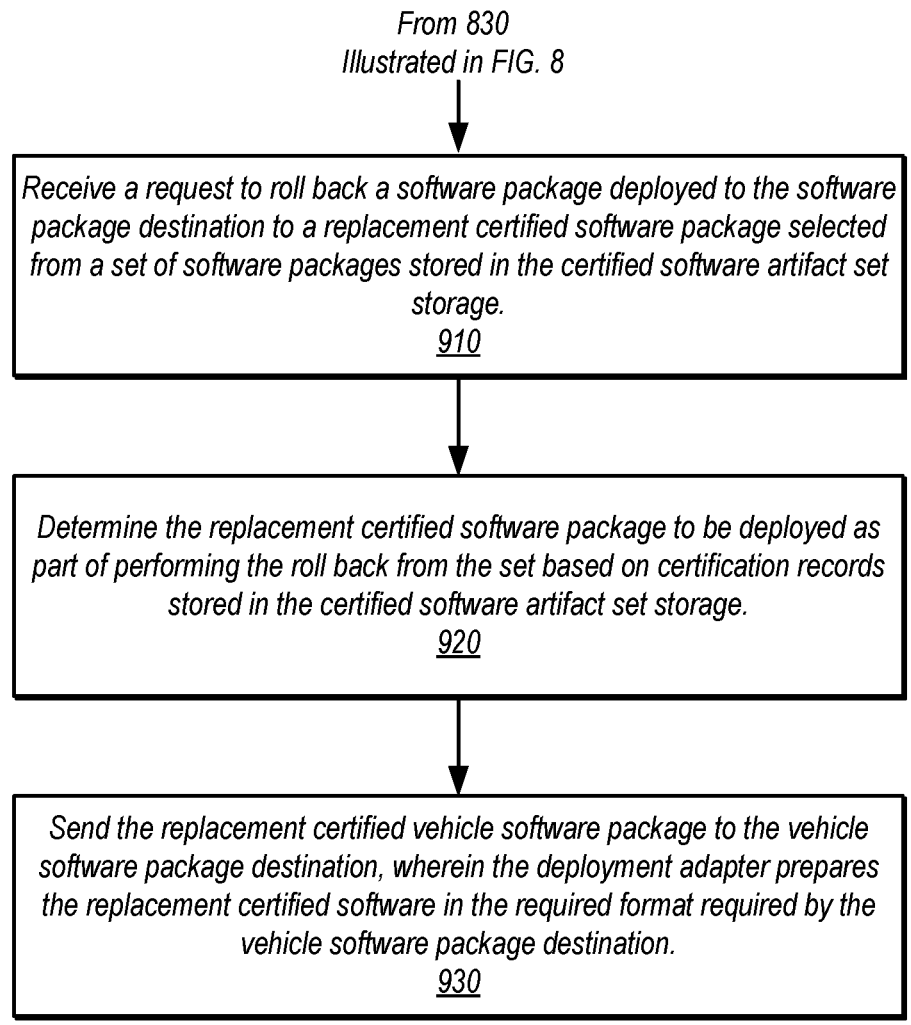
FIG. 9 illustrates a flowchart of operations performed by a vehicle software release management system to initiate rollback of a deployed vehicle software package from a vehicle software package destination, according to some embodiments.

FIG. 9 illustrates a flowchart of operations performed by a vehicle software release management system to initiate rollback of a deployed vehicle software package from a vehicle software package destination, according to some embodiments.

At block 910 a vehicle software release management system receives a request to roll back a software package deployed to the software package destination to a replacement certified software package selected from a set of software packages stored in the certified software artifact set storage. In some embodiments, the rollback request may include a selection from one of the deployed software artifact sets from which the replacement software package may be transmitted to one or more software package destination to be replaced.

At block 920, the vehicle software release management system determines the replacement certified software package to be deployed as part of performing the roll back from the set based on certification records stored in the certified software artifact set storage.

At block 930, the vehicle software release management system sends the replacement certified vehicle software package to the vehicle software package destination, wherein the deployment adapter prepares the replacement certified software in the required format required by the vehicle software package destination. As discussed in FIG. 5, in some embodiments, the software package destination may be any vehicle, vehicle component, or components involved in the vehicle data pipeline. For example, the replacement vehicle software package may be to vehicle edge distribution, vehicle data pipeline, and/or vehicle data lake.

Example Computer System

Figure 10:
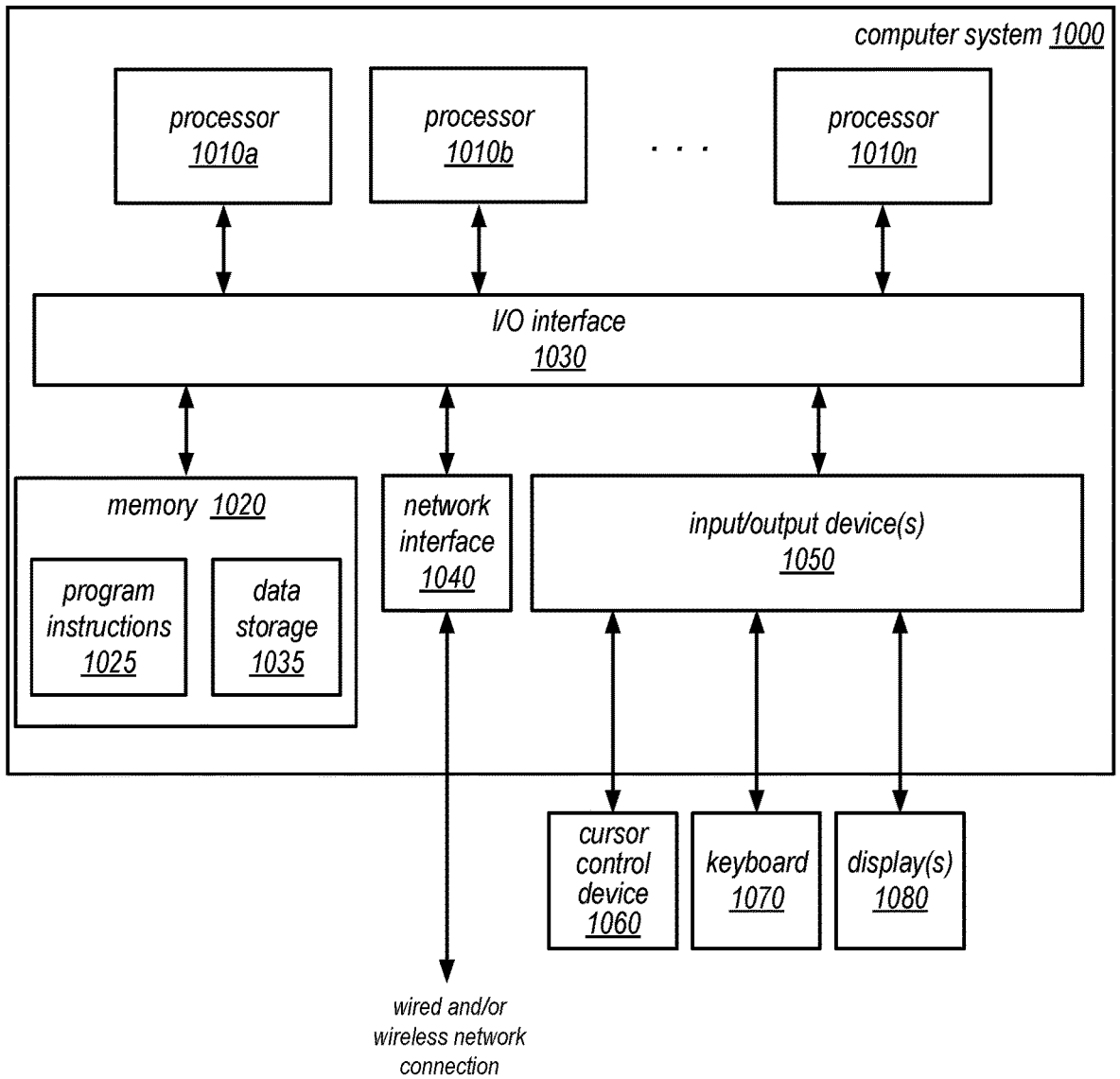
FIG. 10 illustrates a block diagram illustrating an example computer system that implements some or all of the techniques described herein, according to some embodiments.

FIG. 10 illustrates exemplary computer system 1000 usable to implement the vehicle software release management system as described above with reference to FIGS. 1-9. In different embodiments, computer system 1000 may be any of various types of devices, including, but not limited to, a network computer, a mobile device, a consumer device, application server, storage device, a peripheral device such as a switch, modem, router, or in general any type of computing or electronic device.

Various embodiments of program instructions for receiving a vehicle software package, generating a software artifact set, initiating workflows to test and certify the vehicle software package, as described herein, may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such computer systems, or multiple nodes making up computer system 1000, may be configured to host different portions or instances program instructions as described above for various embodiments. For example, in one embodiment some elements of the program instructions may be implemented via one or more nodes of computer system 1000 that are distinct from those nodes implementing other elements.

In some embodiments, computer system 1000 may be implemented as a system on a chip (SoC). For example, in some embodiments, processors 1010, memory 1020, I/O interface 1030 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1020 may be configured to store compression or decompression program instructions 1022 and/or sensor data accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions 1022 may be configured to implement any of the functionality described above. In some embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include data storage 1035 and may include program instructions 1025, which may be processor-executable to implement any element or action described above. In one embodiment, the program instructions may implement the methods described above. In other embodiments, different elements and data may be included.

Computer system 1000 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
 receiving a vehicle software package to be deployed to one or more vehicle models;
 receiving a test plan for the vehicle software package;
 generating, using a vehicle software release management system, a software artifact set for the vehicle software package, wherein the vehicle software release management system is implemented using one or more computing devices comprising one or more processors and memory, wherein the software artifact set comprises vehicle software binaries for a given one of the one or more vehicle models and test resources for a given vehicle model and instructions to configure test resources for the given vehicle model, wherein the instructions are generated based on the test plan, and wherein the test resources are generated based on the test plan;

performing a vehicle software test of the vehicle software binaries of the software artifact set based on a test plan for the given vehicle model;

sending a request to certify the vehicle software package for the given vehicle model, wherein the request comprises the software artifact set and metadata generated by the vehicle software test of the vehicle software binaries for the given vehicle model; and storing, upon certification of the vehicle software package, the software artifact set in a certified software artifact set storage, wherein the stored software artifact set comprises the vehicle software binaries for the given vehicle model and the instructions to configure test resources for the given vehicle model used in the performed vehicle software test.

2. The method of claim 1, further comprising:

storing, upon certification of the vehicle software package, the software artifact set and an associated certification record in the certified software artifact set storage configured to store software artifact sets and associated certification record for respective vehicle software packages that have been certified;

selecting, or receiving a request to select, a certified vehicle software package associated with a certified software artifact set in the certified software artifact set storage to be deployed by a deployment adapter of the vehicle software release management system, wherein the one or more computing devices implement the deployment adapter, and wherein the deployment adapter prepares the selected certified software package in a required format required by a vehicle software package destination; and transmitting the selected certified vehicle software package that has been prepared in the required format to the vehicle software package destination.

3. The method of claim 2, further comprising:

storing one or more additional software artifact sets in the certified software artifact set storage, wherein respective ones of the one or more additional software artifact sets further have respective associated certification records;

selecting, or receiving a request to select, one or more additional certified software packages associated with one or more certified software artifact sets and certification records stored in the certified software artifact set storage to be deployed by the deployment adapter, wherein the deployment adapter prepares the selected one or more additional certified software packages in the required format required by the vehicle software package destination; and transmitting the selected one or more additional certified vehicle software packages that have been prepared in the required format to the vehicle software package destination.

4. The method of claim 3, further comprising:

receiving a request to roll back a software package deployed to the software package destination to a replacement certified software package, wherein the replacement software package is selected from a set of software packages stored in the certified software artifact set storage, wherein the set comprises the deployed certified vehicle software package and the one or more additional deployed certified vehicle software packages;

determining the replacement certified software package to be deployed as part of performing the roll back from the set based on certification records stored in the certified software artifact set storage; and sending the replacement certified vehicle software package to the vehicle software package destination, wherein the deployment adapter prepares the replacement certified software in the required format required by the vehicle software package destination.

5. The method of claim 2, wherein the vehicle software package destination is a vehicle edge distribution system configured to distribute vehicle software packages to vehicles of the given vehicle model, or a vehicle data pipeline for vehicle data from vehicles of the given vehicle model, or a data lake storing vehicle data from vehicles of the given vehicle model.

6. The method of claim 2, further comprising:

identifying a level of authorization associated with an entity submitting the vehicle software package; and determining whether the authorization level is sufficient for generating a software artifact set for the vehicle software package, wherein generating the software artifact set for the vehicle software package is based on the determination that the authorization level of the entity submitting the vehicle software package is sufficient.

7. The method of claim 1, wherein the method comprises:

receiving a test plan for the vehicle software package; and generating a test script according to the test plan wherein the vehicle software testing system performs the test script as part of the vehicle software test, and wherein the metadata generated by the vehicle software test includes results of the test script.

8. The method of claim 1, wherein the software artifact set further comprises one or more of:

system mappings to a deployment destination, one or more configuration files, one or more resource files, or one or more test scripts.

9. The method of claim 1, wherein the test plan further comprises one or more of:

one or more configuration files, an electronic control unit configuration, or one or more dependencies required to execute the vehicle software test.

10. One or more non-transitory, computer-readable storage media, storing program instructions that when executed on or across one or more processors cause the one or more processors to implement a vehicle software release management service that implements:

receiving a vehicle software package to be deployed to one or more vehicle models;

receiving a test plan for the vehicle software package;

generating a software artifact set for the vehicle software package, wherein the software artifact set comprises vehicle software binaries for a given one of the one or more vehicle models and test resources for the given vehicle model and instructions to configure test resources for the given vehicle model, wherein the instructions are generated based on the test plan, wherein the test resources are generated based on the test plan;

performing a vehicle software test of the vehicle software binaries of the software artifact set based on a test plan for the given vehicle model;

sending a request to certify the vehicle software package for the given vehicle model, wherein the request comprises the software artifact set and metadata generated by the vehicle software test of the vehicle software binaries for the given vehicle model; and storing, upon certification of the vehicle software package, the software artifact set in a certified software artifact set storage, wherein the stored software artifact set comprises the vehicle software binaries for the given vehicle model and the instructions to configure test resources for the given vehicle model used in the performed vehicle software test.

11. The one or more non-transitory, computer-readable storage media of claim 10, wherein the vehicle software release management service further implements:

storing one or more software artifact sets and one or more associated certification records in the certified software artifact set storage;

receiving a request to select one or more certified software packages associated with one or more certified software artifact sets in the certified software artifact set storage to be deployed by a deployment adapter of the vehicle software release management service, wherein the one or more non-transitory, computer-readable storage media, further store program instructions that when executed on or across the one or more processors cause the one or more processors to implement the deployment adapter, and wherein the deployment adapter prepares the selected one or more certified software packages in a required format required by a vehicle software package destination; and transmitting the selected one or more certified vehicle software packages that have been prepared in the required format to the vehicle software package destination.

12. The one or more non-transitory, computer-readable storage media of claim 11, wherein the vehicle software release management service further implements:

receiving a request to roll back a deployed software package;

determining a replacement certified software package from the one of one or more certified vehicle software packages stored in the certified software artifact set storage based on certification records stored in the certified software artifact set storage; and sending the replacement certified vehicle software package to the vehicle software package destination, wherein the deployment adapter prepares the replacement certified software in the required format required by a vehicle software package destination.

13. The one or more non-transitory, computer-readable storage media of claim 11, wherein the vehicle software release management service further implements:

identifying an authorization level associated with the request to select the one or more certified software packages; and determining whether the authorization level is sufficient for transmitting the selected one or more certified vehicle software packages to the vehicle software package destination, wherein transmitting the selected one or more certified vehicle software packages is based on the determination that the authorization level is sufficient.

14. The one or more non-transitory, computer-readable storage media of claim 10, wherein the vehicle software package destination is a vehicle edge distribution system configured to distribute vehicle software packages to vehicles of the given vehicle model, or a vehicle data pipeline for vehicle data from vehicles of the given vehicle model, or a data lake storing vehicle data from vehicles of the given vehicle model.

15. The one or more non-transitory, computer-readable storage media of claim 10, wherein the vehicle software release management service further implements:

a simulation configuration user interface configured to:
receive a test plan for the vehicle software package;
generate a test script according to the test plan wherein a vehicle software testing system of the vehicle software release management service performs the test script as part of the vehicle software test; and wherein the one or more non-transitory, computer-readable storage media, further store program instructions that when executed on or across the one or more processors cause the one or more processors to implement the vehicle software testing system, and wherein the metadata generated by the vehicle software test includes results of executing the test script.

16. A system, comprising:

one or more computing devices each comprising one or more processors and memory storing program instructions that, when executed on or across the one or more processors, cause the one or more processors to implement a vehicle software release management system wherein the vehicle software release management system is configured to:

receive a vehicle software package;
receive a test plan for the vehicle software package;
receive or determine a given vehicle model of one or more vehicle models to which the vehicle software package is to be deployed;
generate a software artifact set for the vehicle software package, wherein the software artifact set comprises vehicle software binaries for the given vehicle model and instructions to configure test resources for the given vehicle model, wherein the instructions are generated based on the test plan;
perform, via a vehicle software testing system implemented via at least one of the one or more computing devices, a vehicle software test of the vehicle software binaries of the software artifact set based on the test plan;
send a request to certify the vehicle software package, wherein the request comprises the software artifact set and metadata generated by the vehicle software test of the vehicle software binaries for the given vehicle model; and
store, upon certification of the vehicle software package, the software artifact set in a software artifact set storage, wherein the stored software artifact set comprises the vehicle software binaries for the given vehicle model and the instructions to configure test resources for the given vehicle model used in the performed vehicle software test.

17. The system of claim 16, wherein the vehicle software release management system is further configured to:

store, upon certification of the vehicle software package, the software artifact set in the software artifact set storage comprising a plurality of certified vehicle software artifact sets associated with respective ones of a plurality of certified vehicle software packages for the given vehicle model;

select, or receive a request to select, a certified software package of the plurality of certified vehicle software packages to be deployed by a deployment adapter, wherein the deployment adapter prepares the selected certified software package in a required format required by a vehicle software package destination; and transmit, via a vehicle software distribution system, the selected certified software package that has been prepared in the required format to the vehicle software package destination.

18. The system of claim 16, wherein the vehicle software testing system is configured to generate one or more configuration files that describe a vehicle environment corresponding to the given vehicle model that the vehicle software package is to be deployed to, wherein the one or more configuration files are included in the software artifact set.

19. The system of claim 16, wherein the vehicle release management system further comprises:

a simulation configuration user interface configured to:
receive a test plan for the vehicle software package; and
generate a test script according to the test plan, wherein the vehicle software testing system performs the test script as part of the vehicle software test, and wherein the metadata generated by the vehicle software test includes results of the test script.

20. The system of claim 16, wherein the vehicle release management system further comprises a certification system configured to:

provide a certifying entity the vehicle software artifact set and the metadata generated by the vehicle software test; and receive, from the certifying entity, an indication of certification of the vehicle software package.

\* \* \* \* \*